(No Model.) 2 Sheets—Sheet 1.
H. MYERS.
ROTARY PLOW.
No. 352,655. Patented Nov. 16, 1886.
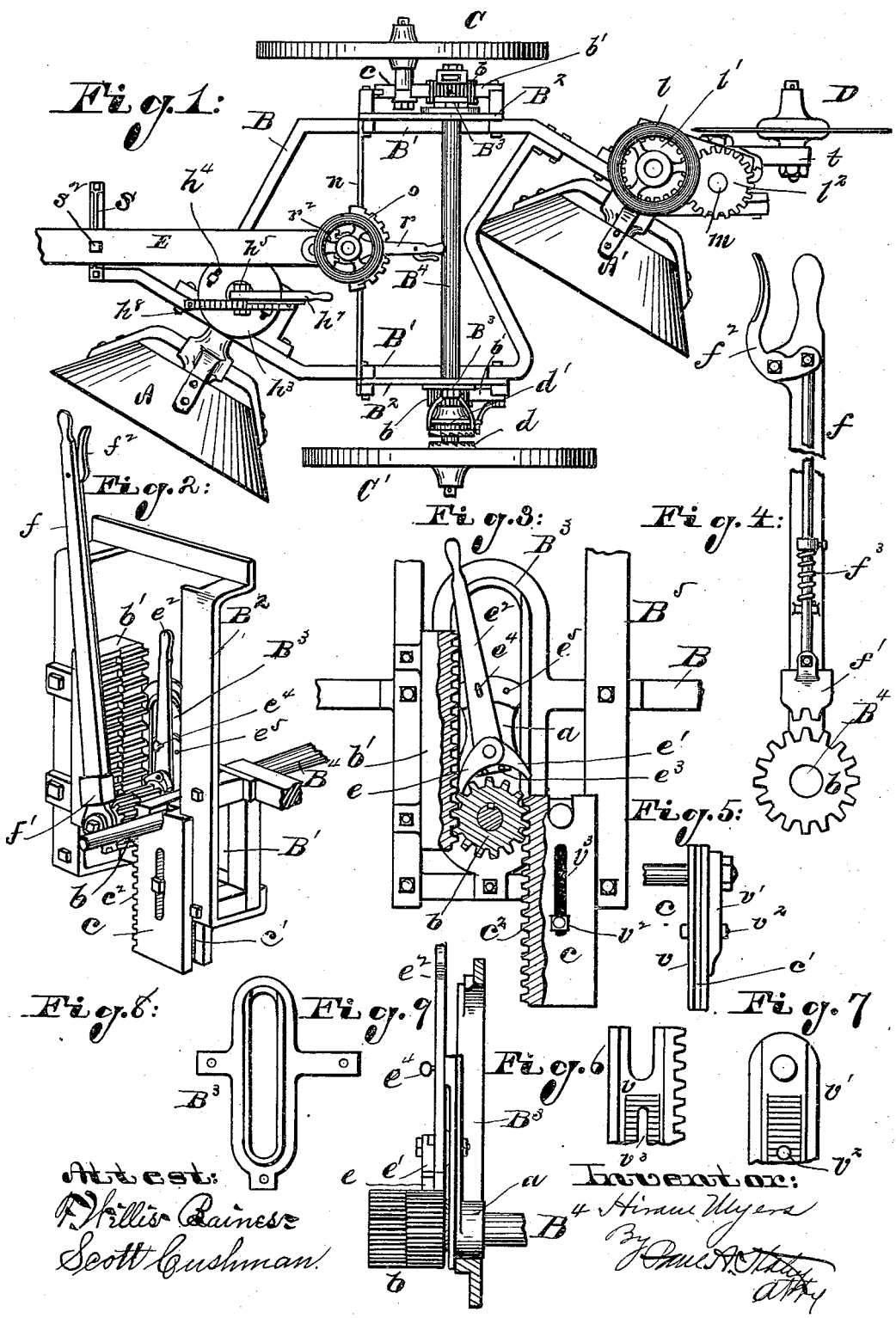

(No Model.) 2 Sheets—Sheet 2.
H. MYERS.
ROTARY PLOW.
No. 352,655. Patented Nov. 16, 1886.
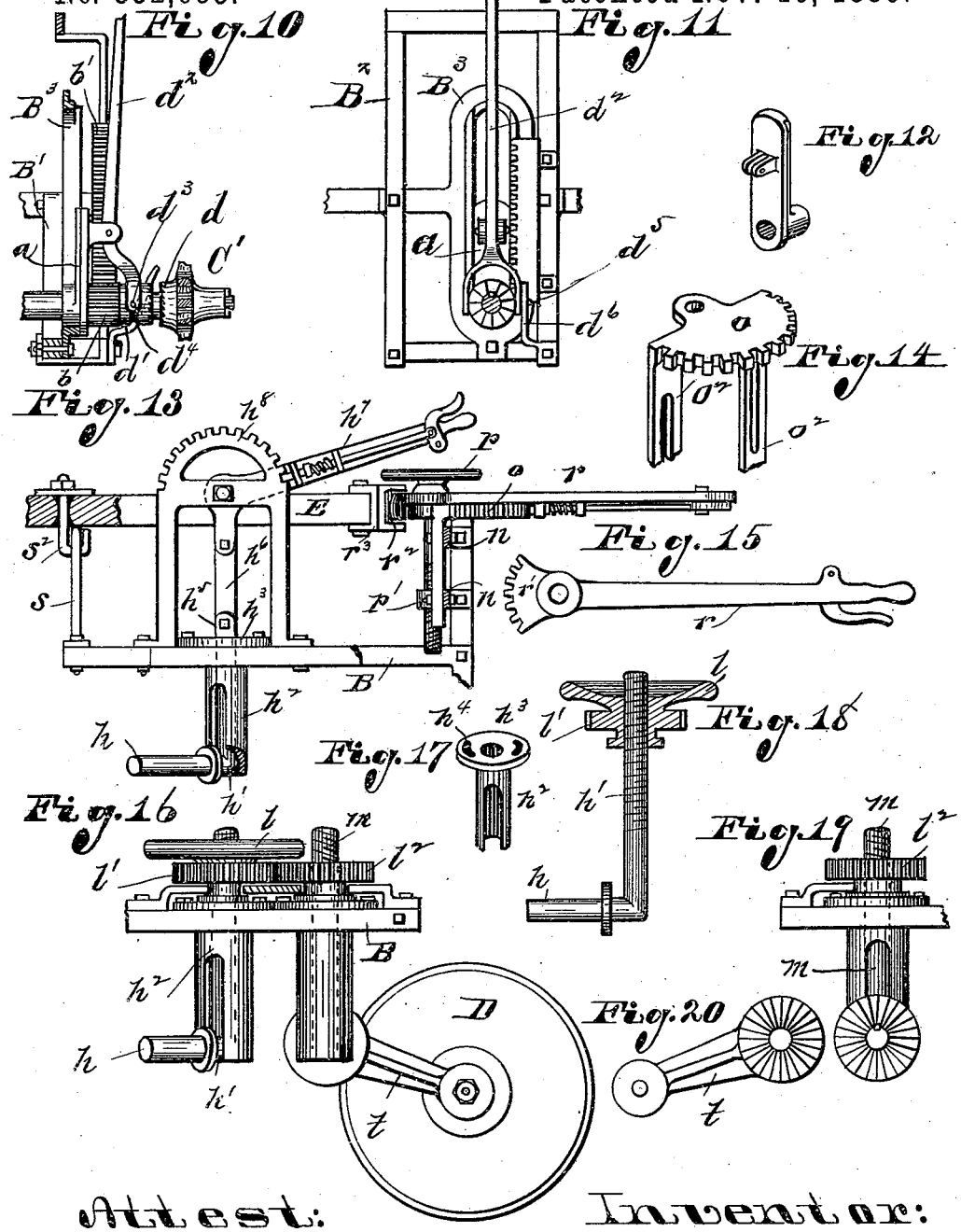

UNITED STATES PATENT OFFICE.

HIRAM MYERS, OF SPRINGFIELD, OHIO.

ROTARY PLOW.

SPECIFICATION forming part of Letters Patent No. 352,655, dated November 16, 1886.

Application filed April 7, 1886. Serial No. 198,061. (No model.)

*To all whom it may concern:*

Be it known that I, HIRAM MYERS, a citizen of the United States, residing at Springfield, in the county of Clark and State of Ohio, have invented certain new and useful Improvements in Rotary Plows, of which the following is a specification.

My invention relates to improvements in rotary plows.

The objects of my invention are, first, to provide a novel arrangement of mechanism for raising and lowering the frame carrying the rotary cutters or plows in relation to the carrying-wheels when it is desired to move the plow from place to place; second, to provide for readily adjusting the angle of the rotary cutters, and thus vary the width of furrow; third, to provide for raising and lowering the plows or cutters in relation to the carrying-frame, to vary the depth of cut; fourth, to provide means for varying the vertical or horizontal angle of the tongue with relation to the frame, and thus level up the plow and change the line of draft. I accomplish these objects by the mechanism shown in the accompanying drawings, in which—

Figure 1 is a plan view of plow embodying my invention. Figs. 2 to 12 are detailed views of the mechanism for raising and lowering the frame and cutting-disks thereof in relation to the carrying-wheel. Fig. 13 is a partial elevation view of the frame, showing the tongue-adjusting mechanism and the manner of raising and lowering the front cutting-disk in relation to the frame. Figs. 14 and 15 are detailed views of the tongue-adjusting mechanism. Figs. 16 to 20 are views showing the method of adjusting the rear cutting-disk. Fig. 21 is a front elevation view of the tongue-iron.

Like parts are indicated by similar letters of reference throughout the several views.

The cutting-disks A A', I construct in the usual manner, the said disks being preferably supported on the main frame B at the front and rear of the carrying-wheels C C', on which the frame is supported. One of the carrying-wheels is adapted to run in the furrow immediately behind the cutting-disk A. The other carrying-wheel, however, runs upon the unplowed ground while the machine is in operation. In conveying the plow from place to place the cutting-disks must be elevated in order that they may not engage in the ground. It is desirable, therefore, that means be provided for raising and lowering the frame carrying the cutting-disks in relation to the carrying-wheels.

Now, since one wheel runs in the furrow and the other upon the land, it is necessary—in order to level up the frame in either a raised or lowered position and to bring the cutting-disks into position to cut at an equal depth when lowered—that one side of the frame be raised or lowered considerably faster than the other. I preferably accomplish this as follows: The main frame B is formed at either side with U-shaped depressions B' and B', secured to the main frame at either side thereof. Immediately over each of the depressions B' B' is an upwardly-extending yoke or side iron, $B^2$, constructed preferably of wrought-iron and bolted to the side of the frame, as shown in Fig. 2. On the inside of the yoke $B^2$, and also secured to the main frame, is a slotted side piece or loop, $B^3$. Each of the loops $B^3$ is provided with a sliding bearing, $a$, in which the respective ends of the main shaft $B^4$ are journaled. The shaft is provided at each end with a pinion, $b$, which is adapted to engage with a rack, $b'$, rigidly secured to one side of the yoke or side iron, $B^2$. The carrying-wheel C', which runs in the furrow, is secured directly on the shaft B. The carrying-wheel C, however, on the opposite side of the frame, is supported in a sliding head, $c$. This sliding head is provided on one side with a grooved bearing, $c'$, adapted to fit over the edge of the side iron or yoke, $B^2$, and to reciprocate thereon. It is provided on its outer face with a rack adapted to engage the pinion on the end of the shaft $B^4$. Now, it will be seen that if the carrying-wheels C and C' were both secured on the shaft $B^4$ the revolution of said shaft would cause the frame to be raised or lowered equally at either side a distance equal to the travel of the racks engaging the respective pinions on said shaft. One of the said carrying-wheels, however, being secured to a sliding head, which is provided with a rack adapted to engage on the opposite side of the pinion on one end of the shaft, will cause this end of the shaft to be raised or lowered—by its revolution—in relation to the said carrying-wheels. Thus an additional movement will be imparted to the said frame at this point, by which it will be elevated or depressed sufficient to compensate for the elevation or depression of the opposite carrying-wheel when said wheel is removed from or dropped into the furrow in which it travels during the operation of plowing.

The carrying-wheel C', which is supported on the shaft $B^4$, is preferably journaled loosely thereon, and is provided on one side of its hub with a serrated face, $d$, adapted to engage with a correspondingly-serrated clutch-collar, $d'$, also on the said shaft. The clutch-collar $d'$ is preferably secured to the shaft $B^4$ by means of a spline or feathered key, which permits a longitudinal movement thereof on the shaft B, but causes said shaft to turn therewith. Pivoted to the sliding bearing $a$ in the loop $B^3$ is a bifurcated lever, $d^2$, preferably provided at its bifurcated end with pins $d^3$, adapted to engage in a groove, $d^4$, in the periphery of said collar. Means are thus furnished for moving the clutch-collar into or out of engagement with the serrated hub of the wheel C'. When the collar is forced into engagement with said hub, a forward movement of the wheel C' will produce a corresponding movement of the shaft, thus raising the frame B. When the frame has reached the limit of its upward movement, a pin, $d^5$, in the side of the lever comes into engagement with a cam-track, $d^6$, secured to the side iron, $B^2$, thus withdrawing said clutch-collar from engagement with the said wheel. On the opposite side of the frame B, and adapted to engage with the pinion $b$ on the opposite end of said shaft, are two pawls, $e$ $e'$. These pawls are supported on the lower end of a lever, $e^2$, pivoted to the sliding bearing $a$. The lever $e^2$ is provided at its lower end with small projections $e^3$ $e^3$, against which the pawls $e$ $e'$ are adapted to rest. It is also provided with an opening adapted to receive a pin, $e^4$, which passes through the same and engages in holes $e^5$ in the sliding bearing $a$. By turning the lever in different positions one of the pawls $e$ $e'$ is held out of engagement with the said pinion, while the other is adapted to engage therewith. Means are thus furnished by which the shaft may be held against revolution in either direction. When it is desired to raise the frame, the lever $e^2$ is turned so that the pawl $e$ engages with the pinion. The shaft is thus permitted to revolve forward, and is held against a backward revolution.

In order that the frame may be raised or lowered by hand, I provide a hand-lever, $f$, journaled at its lower end loosely on the shaft $B^4$ and provided with a sliding dog, $f'$, adapted to engage in the teeth of the pinion $b$. A connection is formed from the sliding dog to a thumb-latch, $f^2$, at the outer end of said lever, by means of which the sliding dog may be thrown into engagement with said pinion, a spring, $f^3$, being preferably used for withdrawing said dog when the thumb-latch is released. It will be seen that by forcing the dog into engagement with the pinion the shaft $B^4$ may, by a reciprocating motion of said lever, be revolved, and thus raise or lower the frame, as desired. In lowering the frame the lever $e^2$ is turned over, so that the pawl $e'$ engages with the pinion $a$, the pawl $e$ being at the same time withdrawn therefrom. It will be seen that by this arrangement the frame and the cutting-disk may not only be raised and lowered as desired, but an additional pressure may be placed thereon to force the same into the ground by turning the shaft $B^4$ until the entire machine rests upon the said cutting-disks.

The rack on the sliding head which supports the carrying-wheel C, I preferably make with two series of teeth, the teeth in one series being adapted to come opposite the spaces of the other. The pinion $b$, which runs therein, is correspondingly formed. By this construction the shaft $B^4$ and the sliding head are held against longitudinal movement by said pinion.

The revolving cutters A A' are journaled on bearings $h$, formed on the lower end of studs or plungers $h'$. These studs are adapted to be raised or lowered in sleeves $h^2$, supported on the main frame B. Each of said sleeves is slotted at one side to form an opening for the extended arm—which forms the bearing for the cutting-disks—to be raised therein. The supporting-sleeves are each provided at the top with a flange, $h^3$, adapted to rest on the top of the frame, and provided with slotted openings $h^4$, through which the bolts which secure said sleeves to the frame are passed. The forward stud or plunger is provided at the top with a lug, $h^5$, to which is pivoted a link, $h^6$, which is connected at the top to a bell-crank lever, $h^7$. This bell-crank lever is provided with a suitable thumb-latch adapted to engage with a segment, $h^8$, on the main frame B. The stud $h'$, which supports the rear cutter, is preferably screw-threaded at the top, and provided with a hand-wheel, $l$, tapped out to fit thereon. This hand-wheel is provided on one side with a spur-pinion, $l'$, adapted to engage with a similar pinion, $l^2$, on the stud $m$, which supports the guiding-wheel D. A revolution of the hand-wheel $l$ therefore will raise or lower the rotary cutter A', as well as the guiding-wheel D. The respective sleeves in which the supporting-studs are journaled, being provided with slotted openings at the top, may be turned as desired to vary the angle of the rotary cutters, thus varying the width of the furrow as desired, and also relieving the plow of side draft.

Extending across the frame and connected to either end of the side iron, $B^2$, are connecting-bars $n$. Supported on these connecting-bars, at or near the center thereof, is a toothed segment, $o$, secured to said connecting-bars by bolts or screws $o'$, which pass through slotted arms $o^2$ on said toothed segment. Extending downward through the said segment $o$ is a hand-screw, $p$, adapted to engage in a screw-threaded nut supported on the lower cross-bar, $n$. Supported at the top of the segment and pivoted thereto by the hand-screw is a hand-lever, $r$, provided with a suitable thumb-latch adapted to engage with the toothed segment $o$. This hand-lever $r$ is constructed at one end with a segment, $r'$, adapted to engage with a series of teeth, $r^2$, on the end of the tongue E. The tongue E is pivoted at the front to a tongue-supporting iron, S, as hereinafter described. Means are thus furnished by which the horizontal angle of the tongue in relation to the frame may be readily varied by turning the lever $r$. The segment $r'$ on the end of said lever is adapted to be engaged on either side by projecting flanges on the casting $r^3$, which supports the teeth $r^2$ on the end of the tongue. By turning the hand-wheel $p$, therefore, after loosening the set-screws $o'$, the lever may be raised or lowered, thus raising or lowering the inner end of said tongue.

The tongue is provided on the front end of the frame with a U-shaped tongue-iron, S, which is preferably provided on its under side with a series of notches, S'. A hook-shaped bolt, S², passes through the said tongue, and is adapted to engage in the respective notches S', and thus form a pivoted connection between said tongue and tongue-iron. The opening through which the bolt S² passes is preferably enlarged at the ends to permit a vertical adjustment of the tongue. By loosening the bolt S² and changing the position of the tongue on the tongue-iron a greater adjustment may be secured, if desired, than can be secured by the movement of the lever $r$.

The guiding-wheel D is supported in the usual way on an arm, $t$, which is provided at one end with a serrated face adapted to engage with a serrated collar on the lower end of the supporting-stud, so that the guiding-wheel may be lowered or raised in relation to the rear cutting-disk, after which the said guiding-wheel and cutting-disk may be raised and lowered together by a movement of the hand-wheel $b$, as above described.

The sliding head which supports the outer carrying-wheel, C, I preferably make in two parts, $v$ $v'$, each of which is provided with a serrated face, as shown in Figs. 6 and 7. These parts are secured together by a bolt, $v^2$, which passes through a slotted opening, $v^3$, in one of the parts. The portion $v'$ carries the rack which engages the pinion. The other portion supports the stud on which the carrying-wheel is journaled. By loosening the bolt $v^2$ and adjusting the relative position of the two parts an adjustment of the carrying-wheel in relation to the sliding head may be secured. Means are thus furnished whereby the plow may be leveled when cutting furrows of different depths.

It will be seen that by the constructions above described a rotary plow is obtained, the cutters in which are capable of being readily raised or lowered, either by hand or by the draft of the plow, for transporting to and from the place of operation, and for plowing, as desired, the plows or cutters in either position being adapted to assume a level position, each cutter being also capable of an independent adjustment in relation to the frame and about a vertical axis, by which the cutting angle thereof may be readily changed. The tongue is also capable of being readily adjusted either in a horizontal or vertical direction, so that the draft thereof may be varied as desired to cause the plow to advance in a straight line and to level up the respective cutting-disks.

Having thus described my invention, I claim—

1. The combination, with the main frame and cutting-disks supported thereon, of carrying-wheels adapted to support said frame, said carrying-wheels being of an equal diameter, and means, substantially as set forth, for elevating and depressing said frame and cutters in relation to said carrying-wheels, whereby one side of said frame is adapted to travel faster than the other to compensate for the lowering of one carrying-wheel into the furrow, substantially as set forth.

2. The combination, with the main frame and the carrying-wheels for supporting said frame, of the rotary cutters, each journaled on an independent supporting-stud adapted to reciprocate in sleeved bearings in said frame, and means for raising and lowering each of said studs, substantially as and for the purpose set forth.

3. The combination, with the main frame and a rotary cutter, of a sleeve supported on the main frame, a stud in said sleeve provided with an angular projection adapted to form a bearing for said cutter, said sleeve being capable of a rotary movement in said frame, and means for raising and lowering said stud in said sleeve, substantially as set forth.

4. The combination, with the rear cutter and the guiding-wheel, of the sleeves and studs for supporting said cutter and guiding-wheel, the said studs being screw-threaded and provided with screw-threaded gears adapted to be revolved by a hand-wheel to raise and lower said studs equally, substantially as set forth.

5. The combination, with the main frame, of the shaft extending across said frame and supported at one end by one of said carrying-wheels, said shaft being provided at either end with pinions adapted to engage racks on either side of said frame, and a sliding head on which the other carrying-wheel is supported, said sliding head being provided with a rack adapted to engage the pinion on said shaft at the opposite side from the stationary rack, substantially as set forth.

6. The combination, with the main frame, of the shaft extending across said frame and provided at either side with pinions adapted to engage with racks on either side of said frame, the carrying-wheels supporting said frame, one of said carrying-wheels being journaled on the end of said shaft and the other supported on a sliding head provided with a rack adapted to engage with the pinion on said shaft, and means for revolving said shaft and for holding the same against revolution in either direction, substantially as set forth.

7. The combination, with the main frame having the yoke or loop secured at either side thereof, of sliding bearings in said yoke, the shaft supported in said sliding bearings and provided with pinions adapted to engage with racks at either side of said frame, a carrying-wheel journaled on said shaft, and a clutch-collar adapted to engage said carrying-wheel and thus connect the shaft thereto, and means for automatically withdrawing said clutch-collar by the raising of said frame, substantially as set forth.

8. The combination, with the main frame, of the shaft extending across said frame, carrying-wheels for supporting said frame and cutters, one of said carrying-wheels being journaled on the shaft and the other on a sliding head adapted to reciprocate in bearings on said frame, pinions on said shaft adapted to engage with stationary racks on either side of said frame, one of said pinions being adapted to engage with a rack on said sliding head, a clutch-collar on said shaft adapted to engage the carrying-wheel journaled thereon, and a pivoted pawl-lever to engage one of the pinions, and thus hold the shaft against revolution in either direction, substantially as set forth.

9. The combination, with the main frame and the yokes secured thereto, of the sliding bearings in said yoke, the shaft supported in said sliding bearings, having a pinion secured thereon, a stationary rack secured to said frame, and a sliding rack adapted to reciprocate on bearings in said frame, a pivoted lever having at its lower end two pawls, and means for securing said lever in different positions of adjustment, whereby the respective pawls are alternately adapted to engage or disengage said pinion, substantially as set forth.

10. The combination, with the main frame and the carrying-wheels, of the shaft supported in sliding bearings at each side of said frame, pinions on said shaft adapted to engage in stationary racks on said frame, one of said racks and pinions being provided with two sets of teeth, the teeth in one set being adapted to come opposite the spaces of the other, and a hand-lever journaled at its lower end on said shaft and provided with a spring-dog adapted to engage with the teeth of one of said pinions, substantially as set forth.

11. The combination, with the main frame and a rotary cutter supported on a sliding stud in said frame, of a guiding-wheel supported by an adjustable arm on a similar stud on said frame, each of said studs being screw-threaded at the top and adapted to be simultaneously elevated or depressed by a hand-wheel and gears thereon, substantially as set forth.

12. The combination, with the main frame provided on either side with U-shaped depressions, side irons secured to said frame on either side opposite to said depressions, and yokes supported in said U-shaped depressions, of a transverse shaft in sliding bearings in said yokes, said shaft being supported by the carrying-wheels, and means for raising and lowering said shaft in relation to said frame, substantially as set forth.

13. The combination, with the main frame, of the tongue pivoted at the forward end of the frame and provided at the rear with a toothed segment having projecting side flanges thereon, a hand-lever provided with a series of teeth adapted to engage said toothed segment between the said flanges, and a raising-screw passing through said lever and adapted to form a pivot for and raise and lower said lever, and thereby raise and lower the end of said tongue, substantially as and for the purpose set forth.

In testimony whereof I have hereunto set my hand this 3d day of April, A. D. 1886.

HIRAM MYERS.

Witnesses:
PAUL A. STALEY,
P. J. CLEVENGER.